United States Patent

Brinkley

[11] Patent Number: 5,705,076
[45] Date of Patent: *Jan. 6, 1998

[54] METHOD FOR FILTERING CONTAMINANTS FROM A MIXTURE

[76] Inventor: Herman E. Brinkley, c/o Hydrocarbon Recovery, Inc. Hi-Way One South, P.O. Box 371, Lawrenceville, Ill. 62439

[*] Notice: The term of this patent shall not extend beyond the expiration date of Pat. No. 5,227,072.

[21] Appl. No.: 626,356

[22] Filed: Apr. 2, 1996

Related U.S. Application Data

[63] Continuation-in-part of Ser. No. 345,832, Nov. 28, 1994, Pat. No. 5,643,449, which is a continuation-in-part of Ser. No. 81,510, Jun. 29, 1993, Pat. No. 5,403,478, which is a continuation-in-part of Ser. No. 812,406, Dec. 23, 1991, Pat. No. 5,229,006, which is a continuation-in-part of Ser. No. 700,493, May 15, 1991, Pat. No. 5,227,072.

[51] Int. Cl.$^6$ .................... C02F 1/28; C02F 1/40
[52] U.S. Cl. .................. 210/693; 210/799; 210/924
[58] Field of Search .................. 210/693, 924, 210/799, 266, 290

[56] References Cited

U.S. PATENT DOCUMENTS

| | | | |
|---|---|---|---|
| Re. 31,087 | 11/1982 | Sohl | 210/671 |
| 1,751,000 | 3/1930 | Goldman | 210/183 |
| 1,958,268 | 5/1934 | Goldman | 210/183 |
| 3,146,192 | 8/1964 | McClintock | 210/40 |
| 3,147,216 | 9/1964 | Oemler | 210/40 |
| 3,176,643 | 4/1965 | Spencer | 112/266 |
| 3,617,556 | 11/1971 | Cole | 210/523 |
| 3,628,660 | 12/1971 | In'tVeld | 210/104 |
| 3,667,608 | 6/1972 | Burroughs et al. | 210/242 |
| 3,679,058 | 7/1972 | Smith | 210/242.4 |
| 3,739,913 | 6/1973 | Bogosian | 210/242 |
| 3,744,638 | 7/1973 | Rhodes | 210/242 |
| 3,968,041 | 7/1976 | DeVoss | 210/242.4 |
| 4,052,306 | 10/1977 | Schwartz et la. | 210/242 S |
| 4,052,313 | 10/1977 | Rolls | 210/242.4 |
| 4,065,923 | 1/1978 | Preus | 61/1 F |
| 4,111,813 | 9/1978 | Preus | 210/282 |
| 4,122,008 | 10/1978 | Allen | 210/197 |
| 4,133,088 | 1/1979 | Hikobe et al. | 28/279 |
| 4,165,282 | 8/1979 | Bennett et al. | 210/40 |
| 4,234,420 | 11/1980 | Turbeville | 210/671 |
| 4,234,424 | 11/1980 | Piepho | 210/771 |
| 4,316,804 | 2/1982 | Bocard et al. | 210/671 |
| 4,332,854 | 6/1982 | Parker | 428/377 |
| 4,366,067 | 12/1982 | Golding et al. | 210/671 |
| 4,377,478 | 3/1983 | Rolls et al. | 210/242.3 |
| 4,395,336 | 7/1983 | Eng | 210/693 |
| 4,416,782 | 11/1983 | Kerres | 210/634 |
| 4,439,324 | 3/1984 | Crotti | 210/924 |
| 4,663,222 | 5/1987 | Ohue et al. | 428/224 |
| 4,737,394 | 4/1988 | Zafiroglu | 428/102 |
| 4,743,483 | 5/1988 | Shimizu et al. | 428/89 |
| 4,859,348 | 8/1989 | Jusaitis et al. | 210/799 |
| 4,965,129 | 10/1990 | Bair et al. | 428/398 |
| 5,002,814 | 3/1991 | Knack et al. | 428/85 |
| 5,084,171 | 1/1992 | Murphy et al. | 210/238 |
| 5,165,821 | 11/1992 | Fischer et al. | 405/63 |
| 5,178,778 | 1/1993 | Sachse et al. | 210/799 |

(List continued on next page.)

FOREIGN PATENT DOCUMENTS

| | | |
|---|---|---|
| 971568 | 1/1951 | France. |
| 55-94612 | 7/1980 | Japan. |

*Primary Examiner*—Cynthia L. Nessler
*Attorney, Agent, or Firm*—Wood, Phillips, VanSanten, Clark & Mortimer

[57] ABSTRACT

A method for filtering contaminants from a mixture containing an oil-based fluid and a non-oil based fluid is provided. The method includes the steps of providing an oil-based fluid absorbent cloth of man-made fibers, the absorbent cloth having at least a portion thereof that is napped so as to define voids therein; forcing the mixture to flow through the absorbent cloth; trapping, in the absorbent cloth, contaminants from the mixture as the mixture is forced through the absorbent cloth; and absorbing, with the absorbent cloth, the oil-based fluid from the mixture while allowing the non-oil based fluid to flow through the absorbent cloth.

6 Claims, 3 Drawing Sheets

U.S. PATENT DOCUMENTS

| | | | |
|---|---|---|---|
| 5,186,831 | 2/1993 | DePetris | 210/242.4 |
| 5,227,072 | 7/1993 | Brinkley | 210/671 |
| 5,229,006 | 7/1993 | Brinkley | 210/671 |
| 5,252,215 | 10/1993 | McFarlane et al. | 210/502.1 |
| 5,259,958 | 11/1993 | Bronnec et al. | 310/526 |
| 5,329,974 | 7/1994 | Paping | 141/11 |
| 5,374,600 | 12/1994 | Hozumi et al. | 502/402 |
| 5,403,478 | 4/1995 | Brinkley | 210/242.4 |
| 5,496,573 | 3/1996 | Tsuji et al. | 426/84 |

1

METHOD FOR FILTERING CONTAMINANTS FROM A MIXTURE

CROSS-REFERENCE TO RELATED APPLICATIONS

This application is a continuation-in-part of U.S. Ser. No. 08/345,832, entitled "APPARATUS FOR LIFTING OIL-BASED LIQUID" that was filed on Nov. 28, 1994, and issued as U.S. Pat. No. 5,643,449, which is a continuation-in-part of U.S. Ser. No. 08/081,510, entitled "OIL-BASED FLUID ABSORBENT ARTICLE" that was filed on Jun. 29, 1993, and issued as U.S. Pat. No. 5,403,478, which is a continuation-in-part of U.S. Ser. No. 07/812,406, entitled "METHOD OF RECOVERING OIL-BASED FLUID AND APPARATUS" that was filed on Dec. 23, 1991, and issued as U.S. Pat. No. 5,229,006, which is a continuation-in-part of U.S. Ser. No. 07/700,493, entitled "METHOD OF RECOVERING OIL-BASED FLUID" that was filed on May 15, 1991, and issued as U.S. Pat. No. 5,227,072.

FIELD OF THE INVENTION

This invention relates to filtration systems and, more particularly, to filtration systems for use in filtering a medium that inherently contains an oil-based fluid contaminant.

BACKGROUND OF THE INVENTION

Currently, a large percentage of all painted metal parts are prepped prior to painting by using a dip or spray wash water system to remove mill oil and other surface contaminants from the metal part. Typically, such wash water systems utilizes a water/detergent mixture as the cleaning solution. Commonly, a fixed volume of the water/detergent mixture is utilized in the wash water system and is recirculated through the system so that a succession of parts may be cleaned. Contaminants, including mill oil and other oil-based fluids, are washed from the metal parts and become intermixed with the volume of water/detergent mixture. Normally, a filtration system is included in the wash water system to filter out the contaminants. It is common to employ disposable "bag filters" as the filter element in these filtration systems.

One problem associated with conventional bag filters is their inability to satisfactorily filter mill oil and other oil-based fluids from the water/detergent mixture. It is known to utilize a felt or cotton element in conjunction with a conventional bag filter to increase the filtration system's ability to remove the oil-based fluids from the water/detergent mixture. However, this solution has proved to be less than satisfactory due to the felt or cotton element's tendency to absorb both water and the mill oil, thereby rapidly gumming-up or clogging and increasing the pressure drop in the filtration system to unacceptable levels.

There is a need for a new and effective apparatus for filtering contaminants from a mixture containing an oil-based fluid, such as mill oil, and a non-oil based fluid, such as water, that is directed toward overcoming one or more of the problems discussed above.

SUMMARY OF THE INVENTION

In accordance with the present invention, a method for filtering contaminants from a mixture containing an oil-based fluid and a non-oil based fluid is provided. The method includes the steps of providing an oil-based fluid absorbent cloth of man-made fibers, the absorbent cloth having at least a portion thereof that is napped so as to define voids therein; forcing the mixture to flow through the absorbent cloth; trapping, in the absorbent cloth, contaminants from the mixture as the mixture is forced through the absorbent cloth; and absorbing, with the absorbent cloth, the oil-based fluid from the mixture while allowing the non-oil based fluid to flow through the absorbent cloth.

One feature is the additional steps of recovering the oil-based fluid from the absorbent cloth and reusing the absorbent cloth in the forcing, trapping, and absorbing steps.

One feature is the additional steps of providing a fabric filter and forcing the mixture through the fabric filter.

In a preferred embodiment, the step of providing an oil-based fluid absorbent cloth is included in a step of providing an oil-based fluid absorbent article. The oil-based fluid absorbent article includes an oil-based fluid absorbent cloth of man-made fibers and an oil-based fluid absorbent filler of man-made material. The absorbent cloth has at least a portion thereof that is napped so as to define voids therein. Further, the absorbent cloth is formed from two sheets of sheet-form cloth and the absorbent filler is encased within the two sheets of sheet-formed cloth.

One feature is the absorbent filler being in the form of shredded oil-based fluid absorbent cloth.

Another feature is the filler being either polyester open-celled foam or polyether open-celled foam.

The present invention provides an effective method and apparatus for filtering contaminants from a mixture containing an oil-based fluid and a non-oil based fluid. The method has proven highly successful in removing mill oil and other oil-based fluids from the water/detergent mixture utilized in a wash water system for cleaning metal parts prior to painting. The method allows oil-based fluid, such as mill oil, to be absorbed by the filtration system while allowing the non-oil based fluid, such as the water/detergent mixture, to flow through the filtration system with a minimized amount of the water/detergent mixture being absorbed by the filtration system. The method has proven successful at providing the above benefits without rapidly gumming-up or clogging and/or causing an unacceptable pressure loss in the filtration system.

Additionally, because the method allows for the oil-based fluid to be recovered from the absorbent cloth, the amount of waste disposal is decreased and the oil-absorbent cloth may be used multiple times.

Other objects, features and advantages of the invention will be apparent from the following detailed description taken in conjunction with the accompanying drawings.

BRIEF DESCRIPTION OF THE DRAWINGS

The features of this invention which are believed to be novel are set forth with particularity in the appended claims. The invention, together with its objectives and advantages thereof, may best be understood by reference to the following description taken in conjunction with the accompanying drawings, in which like reference numerals identify like elements in the Figures and in which:

DETAILED DESCRIPTION OF THE PREFERRED EMBODIMENTS

Figure 1:
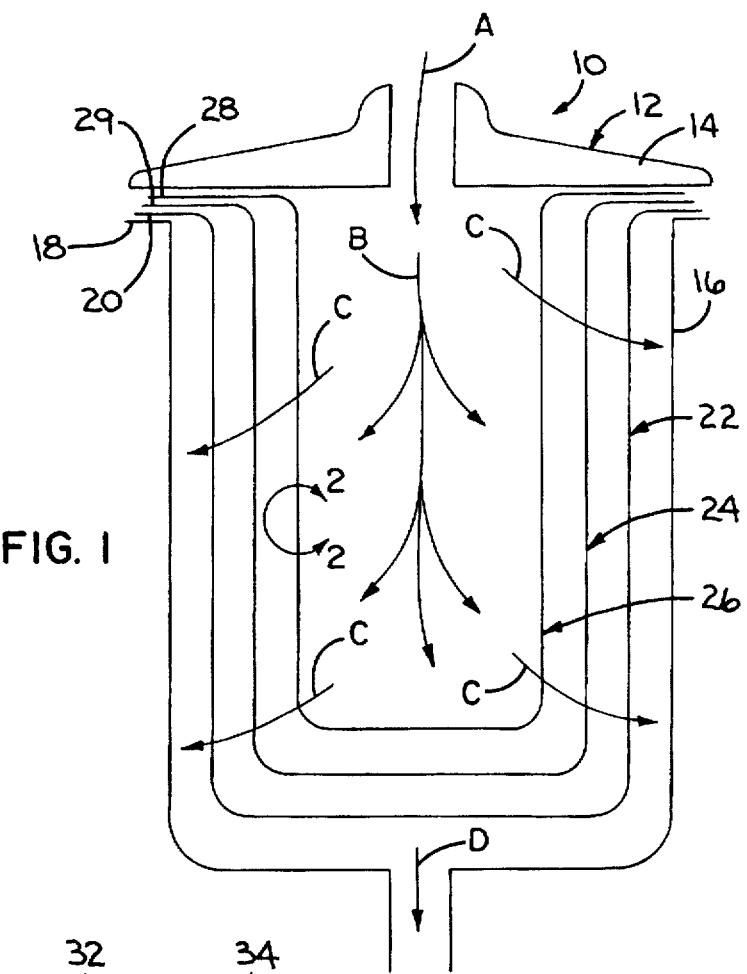
FIG. 1 is a diagrammatic representation of a filtration system embodying the method and apparatus of the present invention.

FIG. 1 is a diagrammatic representation of a filtration system 10 employing a two-part pressure vessel 12 having a cap 14 and a housing 16. The housing 16 includes a flange 18 that supports a flange 20 of a strainer basket 22 that is contained within the pressure vessel 12. A bag filter 24 is contained within and supported by the strainer basket 22. Finally, a bag shaped, oil-based fluid absorbent filter element 26 is contained within the bag filter 24 and supported by the bag filter 24 and the strainer basket 22. The bag filter 24 and the filter element 26 have respective upper portions 28 and 29 that form a fluid-tight seal between the cap 14 and the flange 18.

The pressure vessel 12, the strainer basket 22, and bag filter 24 are well known and may take any of the forms commonly employed by those skilled in the art. Known bag filters are formed from a fabric made from one of the following materials: polyester, polypropylene, acrylic, Nomex, Teflon, rayon viscose, Nylon, polyester mesh, Nylon mesh, and pressed wool felt.

Figure 2:
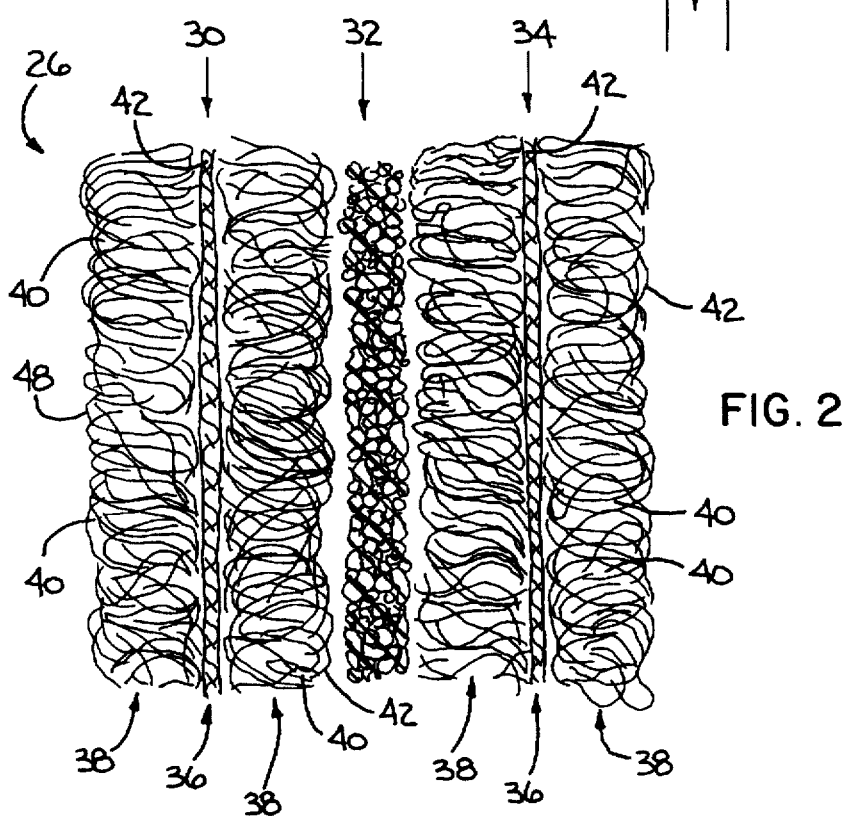
FIG. 2 is an enlarged view of the encircled portion 2—2 in FIG. 1 showing a section through an oil-based fluid absorbent filter element of the present invention.

As best seen in FIG. 2, the filter element 26 preferably includes a first layer 30, a second layer 32 and a third layer 34 (the thickness of the first and third layers 30 and 34 is exaggerated). The first and third layers are formed from an oil-based fluid absorbent cloth 36 having a pair of naps 38. Voids 40 are defined within the naps 38 and are presently believed to enhance the absorption of oil-based fluid by the absorbent cloth 36. The cloth is woven from man-made oil-base fluid absorbent fibers 42. The absorbent cloth 36 is preferably hydrophobic. The second layer 32 is formed from a suitable man-made, oil-based fluid absorbent filler material. The filler material should exhibit minimal degradation due to exposure to the oil-based fluid and be capable of withstanding the repeated forces experienced in recovery of the oil-based fluid from the filter element 26. These forces include those induced by squeezing, wringing or compressing. Preferably, the filler material is a flexible, open-cell foam, made from polyester or polyether.

The preferred forms of the absorbent cloth 36 and fibers 42 are disclosed in U.S. Pat. Nos. 5,227,072, issued Jul. 13, 1993 to Brinkley; 5,229,006, issued Jul. 20, 1993 to Brinkley; and 5,403,478, issued Apr. 4, 1995 to Brinkley, the inventor of this apparatus and method. The absorbent cloth 36 and fibers 42 are discussed in detail in each of these patents with reference to FIGS. 2, 3 and 4 of each of the patents. The disclosures of all three of these patents are incorporated herein by reference in their entirety.

Figure 3:
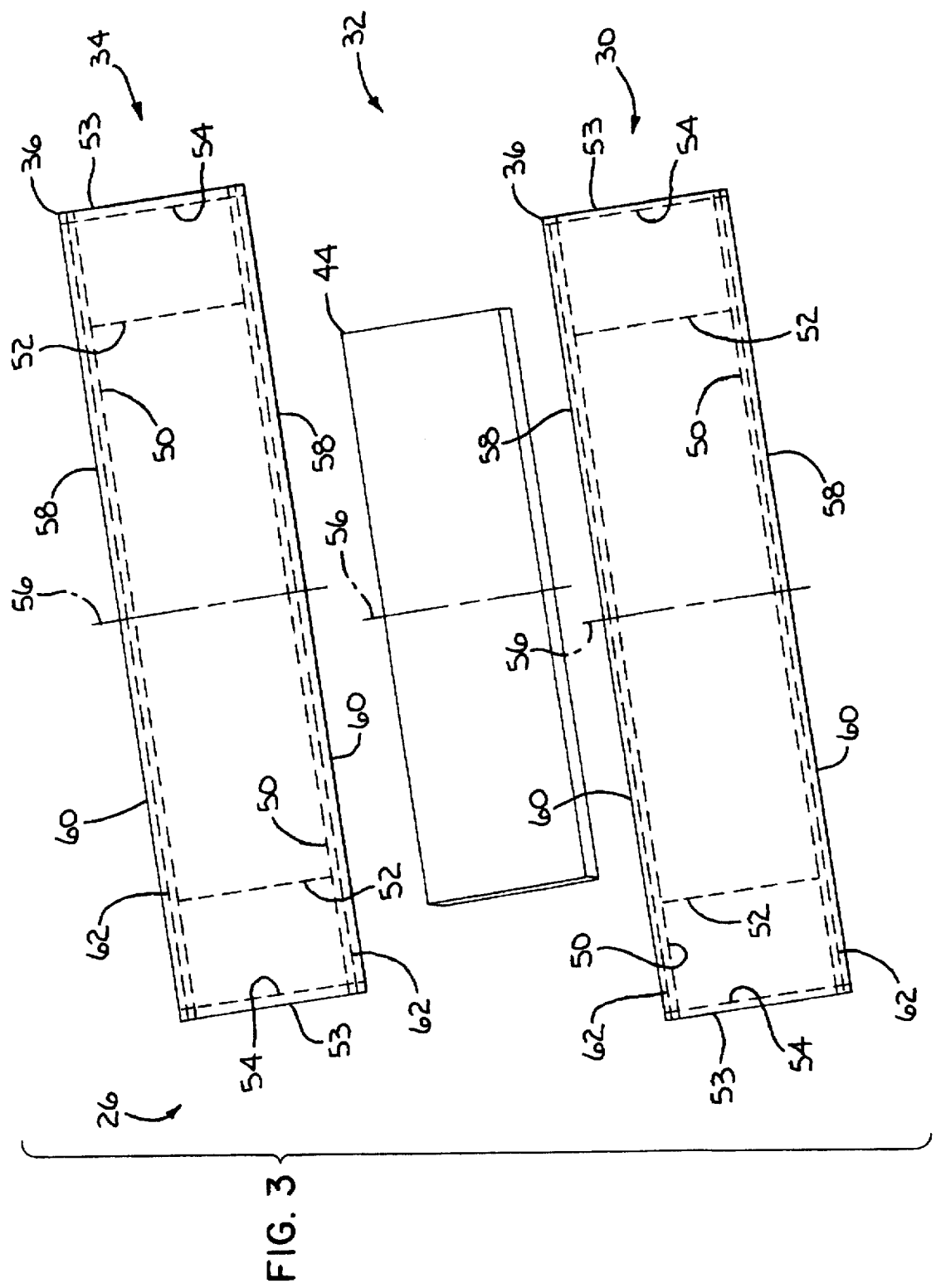
FIG. 3 is an exploded view of the oil-based fluid absorbent filter element shown in FIGS. 1 and 2.

FIG. 3 illustrates the construction of the filter element 26. The first and third layers 30 and 34 are rectangular sheet forms of the absorbent cloth 36. The second layer 32 is a rectangular piece of open-cell foam 44 in sheet form. In alternate embodiments, oil-based fluid absorbent cloth 30, in the form of shredded pieces, may be utilized to form the second layer 32 in place of the open-cell foam 44. The second layer 32 is placed between the first and third layers 30 and 34. Next, the first and third layers 30 and 34 are sewn together along the dashed lines 50 and 52 to encase the second layer 32 between the first and third layers 30 and 34.

The lines 50 and 52 are outside of and immediately adjacent to the perimeter of the second layer 32 defined by the sheet form of the open-celled foam 44. Next, the ends 53 of the first and second layer are sewn together using a Merrow stitching machine along lines 54. Finally, the first, second and third layers 30, 32 and 34 are folded about the common center line 56 and the edges 58 of the first and second layers 30 and 32 on one side of the center line 56 are sewn to the edges 60 of the first and second layers 30 and 34 on the opposite side of center line 56 along the lines 62 using a Merrow stitching machine to form side seams.

Figure 4:
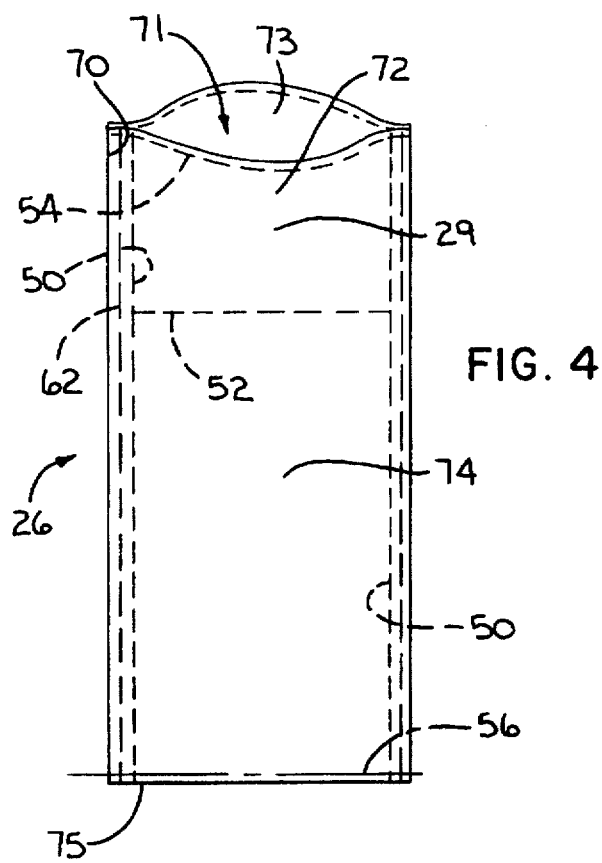
FIG. 4 is a perspective view of the oil-based fluid absorbent filter element shown in FIGS. 1, 2 and 3.

As best seen in FIG. 4, the above-described construction forms the bag-shaped filter element 26 having a single open end 70 that opens into a cavity 71 defined between a front portion 72 and a back portion 73 of the filter element 26. The upper portion 29 of the filter element 26 is defined between the sewn lines 52 and 54. A lower portion 74 is defined between the stitched line 52 and the fold 75 about the center line 56. In the upper portion 29, each of the portions 72 and 73 includes only the first and third layers 30 and 34. In the lower portion 74, each elf the portions 72 and 73 consists of the first, second and third layers 30, 32 and 34, as previously described with respect of FIG. 2.

Preferably, the lower portion 74 will be contained within the bag filter 24 and the strainer basket 22, with the upper portion 29 extending from the bag filter 24.

In the preferred embodiment, the cloth 30 is Style 7660-7666 (as referenced in 1991) from Malden Mills, New York, N.Y., with naps 38 on both sides of the cloth 30, each nap having a thickness of around 2 millimeters. This cloth is also available under the trade name Polar Cloth. The preferred foam for the second layer 32 is open-cell polyester foam, commercially available from General Foam, Paramus, N.J. Preferably the foam has a thickness of around 1 inch and a density in the range of 1 to 2 pounds per cubit foot.

As seen in FIG. 1, in operation, the pressurized water/detergent mixture from a wash water system enters the pressure vessel 12 through the cap 14, as shown by arrow A. The mixture is directed through the open end 70 into the cavity 72 of the filter element 26, as shown by arrows B. The mixture is then forced under pressure to flow through the absorbent filter element 26, then the bag filter 24, and finally, the basket 22 as shown by arrows C. The mixture then flows under pressure out of the housing 16, as indicated by arrow D.

As the mixture is forced through the filter element 26, oil-based fluid in the form of mill oil is absorbed by the absorbent cloth 36 and the foam 44 while the non-oil based fluid in the form of water is allowed to pass through the absorbent cloth 36 and the foam 44. The absorbent cloth 36 is believed to have performed successfully in this function because of its ability to absorb a maximum amount of the oil-based fluid while absorbing a minimum amount of the non-oil based fluid, thereby allowing the non-oil based fluid to flow therethrough. The foam 44 is provided in the filter element 26 to increase the amount of the oil-based fluid that can be absorbed by the filter element 26. In this regard, it is believed that shredded pieces of the absorbent cloth 36 would provide the maximum amount of absorption in the second layer 32. However, the open-cell foam 44 is preferred for the second layer 32 because it is less expensive.

Figure 5:
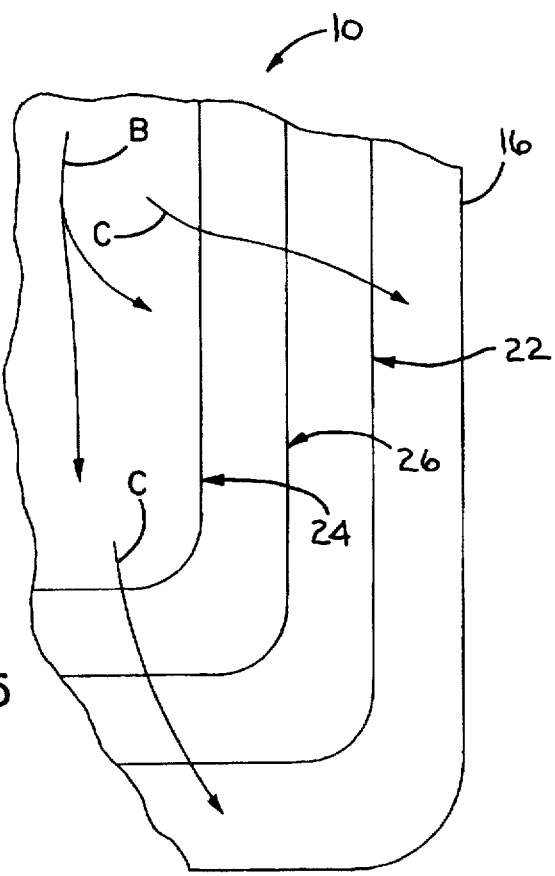
FIG. 5 is a fragmentary diagrammatic representation, similar to FIG. 1, of another embodiment of a filtration system embodying the method and apparatus of the present invention.

Further, as the mixture is forced to flow through the filter element 26, the absorbent cloth 30 and the foam 44 trap solid contaminants from the mixture. In this regard, it may be preferable to place the bag filter 24 inside of the filter element 26, thereby forcing the water/detergent mixture to flow through the bag filter 24 before flowing through the filter element 26, as shown in FIG. 5. This would allow the bag filter 24 to trap solid contaminants from the mixture and reduce the amount of solid contaminants trapped by filter element 26, thereby increasing the useful life of the filter element 26. This may be desirable because, typically, the bag filter 24 must be disposed of after a single use, while the filter element 26 will be capable of being reused several times. However, depending upon the amount of oil-based fluid in the mixture, the arrangement shown in FIG. 1 with the filter element 26 inside of the bag filter 24 may be preferred because it would help to prevent clogging of the bag filter 24 by the oil-based fluid. This is partly dependent upon the material chosen for the bag filter 24, as some materials, such as cotton, tend to clog faster than others.

Periodically, the filter element 26 may be removed from the bag filter 24 and the pressure vessel 12. The oil-based fluid absorbed by the filter element 26 can be recovered from the cloth 36 and the fibers 42 by compressing the cloth 36 and the fibers 42 to squeeze the oil-based fluid therefrom. The oil-based fluid "recovered" in this manner can then be recycled and put to beneficial use, rather than creating a waste disposal problem. More detailed explanations of the recovery of the oil-based fluid from the absorbent cloth 36 and the fibers 42 is provided in U.S. Pat. Nos. 5,227,072, 5,229,006, and 5,403,478, the details of which have already been incorporated herein by reference.

It will be appreciated that the filter element 26 could be formed by utilizing a single layer 30 of the absorbent cloth 36 without the second or third layers 32 and 34.

Representative oil-based fluids include: crude oils, i.e., hydrocarbons; mineral oils, e.g., petroleum and petroleum derived, e.g., lubricants; fuel oils, heating oils and the like; vegetable oils, e.g., drying oils, non-drying oils and the like; animal oils, e.g., fish oils, sperm oil and the like; products obtained from hydrocarbons, e.g., solvents; mixtures of oil-based liquids and impurities; emulsions of oil-based liquids and impurities, and the like. Representative drying oils include linseed oil, tung oil and the like. Representative non-drying oils include castor oil, coconut oil and the like.

Representative solid contaminants include minerals and metals and their oxides that are the result of production of ferrous and non-ferrous materials such as steel, aluminum and the like.

While this invention has been described in terms of a filtration system 10, used in conjunction with a wash water system for cleaning metal parts prior to painting, it should be understood that these embodiments are presented by way of illustration only, and that the invention is not necessarily limited thereto. For example, the filter element 26 may also prove useful for filtering oil-based fluid from a mixture in gaseous form.

Accordingly, modifications and variations within the spirit and scope of the claims that follow will be readily apparent from this disclosure, as those skilled in the art will appreciate.

I claim:

1. A method for filtering contaminants from a mixture containing an oil-based fluid and a non-oil-based fluid, the method comprising the steps of:

providing an oil-based fluid absorbent article including an oil-based fluid absorbent cloth of man-made fibers and an oil-based fluid absorbent filler of man-made material, the absorbent cloth having at least a portion thereof that is napped so as to define voids therein;

forcing the mixture to flow through the absorbent cloth and the absorbent filler;

trapping, in the absorbent cloth and absorbent filler, contaminants from the mixture as the mixture is forced through the absorbent cloth and the absorbent filler; and absorbing, with the absorbent cloth and the absorbent filler, the oil-based fluid from the mixture while allowing the non-oil-based fluid to flow through the absorbent cloth and the absorbent filler.

2. The method of claim 1 wherein the absorbent filler is an open cell foam.

3. The method of claim 2 wherein the foam is selected from the group consisting of polyester foams and polyether foams.

4. The method of claim 1 wherein the absorbent filler is a shredded oil-based fluid absorbent cloth.

5. The method of claim 1 wherein the absorbent filler is encased by the absorbent cloth.

6. The method of claim 1 wherein the absorbent cloth is formed from two sheets of sheet-form cloth and the absorbent filler is encased within the two sheets of sheet-form cloth.

* * * * *